(12) United States Patent
Rachels

(10) Patent No.: US 7,284,742 B1
(45) Date of Patent: Oct. 23, 2007

(54) FLOW CONTROL VALVE

(76) Inventor: Lem Rachels, 1725 E. Dixon Blvd., Shelby, NC (US) 28150

( * ) Notice: Subject to any disclaimer, the term of this patent is extended or adjusted under 35 U.S.C. 154(b) by 0 days.

(21) Appl. No.: 11/224,729

(22) Filed: Sep. 12, 2005

(51) Int. Cl.
*F16K 31/44* (2006.01)

(52) U.S. Cl. .................................... 251/263; 251/251

(58) Field of Classification Search ............... 173/169; 251/260, 262, 263, 339, 251
See application file for complete search history.

(56) References Cited

U.S. PATENT DOCUMENTS

| | | | |
|---|---|---|---|
| 2,551,758 A | 5/1951 | Newton | 236/92 R |
| 2,664,715 A | 1/1954 | Borgerd | 62/184 |
| 3,016,929 A * | 1/1962 | Rapaport | 141/263 |
| 3,872,684 A | 3/1975 | Scott | 62/181 |
| 4,193,269 A | 3/1980 | Barry | 62/171 |
| 4,274,266 A | 6/1981 | Shires | 62/171 |
| 4,448,391 A * | 5/1984 | Young | 251/263 |
| 4,542,627 A | 9/1985 | Welker | 62/171 |
| 4,605,200 A * | 8/1986 | Huppee | 251/258 |
| 5,117,644 A | 6/1992 | Fought | 62/171 |
| 5,213,486 A * | 5/1993 | Beattie et al. | 417/440 |
| 5,285,651 A | 2/1994 | Marine | 62/171 |
| 5,361,804 A * | 11/1994 | Keller et al. | 137/801 |
| 5,605,052 A | 2/1997 | Middleton et al. | 62/171 |
| 6,032,922 A * | 3/2000 | Shew | 251/99 |
| 6,105,376 A | 8/2000 | Stewart et al. | 62/171 |
| 6,253,565 B1 | 7/2001 | Arledge | 62/305 |
| 6,438,977 B1 | 8/2002 | McKay | 62/171 |
| 6,655,162 B2 | 12/2003 | McKee | 62/171 |
| 6,658,872 B1 | 12/2003 | James | 62/171 |
| 6,994,318 B2 * | 2/2006 | Burke | 251/251 |

* cited by examiner

*Primary Examiner*—Gregory Huson
*Assistant Examiner*—Andrew J. Rost
(74) *Attorney, Agent, or Firm*—Alfred J. Mangels

(57) ABSTRACT

A flow control valve for controlling water flow, for example through a refrigeration unit condenser spray cooling system. The valve includes an arm that carries a paddle adapted to be placed in an air stream for deflection by an air current. Movement of the paddle causes a cam pin within the valve to rotate, thereby radially deflecting a valve pin within the flow passageway to pivot relative to a valve seat at an orifice. The valve pin deflection results in an opening between the valve pin and the orifice to allow flow through the valve. Paddle deflection is thermally controlled by a bimetallic spiral spring 32, which can be adjusted to regulate the temperature at which the paddle is allowed to deflect relative to the body of the valve.

17 Claims, 3 Drawing Sheets

FLOW CONTROL VALVE

BACKGROUND OF THE INVENTION

1. Field of the Invention

The present invention relates to a flow control valve for liquids. More particularly, the present invention relates to a flow control valve having a compact structure and that is operable between on and off positions by a movable arm, for example an arm that is responsive to the force of a moving gas stream, such as an airflow stream, or to the level of a float in a liquid reservoir.

2. Description of the Related Art

Flow control valves of many different structural designs have been developed over the years. And their actuation methods have also been of different forms. For example, in connection with spray cooling systems for air conditioning and refrigeration units, water flow control can be controlled by a valve that has a paddle placed in the path of an air stream to sense when the condensing unit fan is in operation, and thus when spray cooling of the condenser can be beneficial.

An example of one such spray cooling arrangement is disclosed in U.S. Pat. No. 6,438,977, which issued on Aug. 27, 2002, to McKay. The flow control valve includes an axially reciprocable plunger that is movable toward and away from a valve seat into and out of a water-flow-blocking position, based upon movement of a paddle in response to the force provided upon initiation of a flow of air against the paddle. The airflow is generated by a cooling fan for blowing cooling air across the coils of the condenser. However, the valve that is illustrated and described in that patent is controlled based only upon airflow, and it operates independently of the ambient temperature. Thus, it allows cooling water flow at times when such flow is not needed, such as at lower ambient temperature conditions when the cooling air flow itself is sufficient for adequate condenser coil cooling. When operated unnecessarily, such an arrangement wastes water and thereby adds to the operating cost of the system.

Additionally, the McKay valve is an axially operated valve. In that valve structure the flow shutoff member is moved axially toward and away from an orifice through which the water flows. It thus must be moved into a closed, no-flow position by a larger force that is sufficient to overcome the force resulting from the upstream water pressure that acts against the facing surface of the shutoff member. Accordingly, either a longer paddle lever arm is needed, or a larger paddle surface area against which the airflow stream impinges must be provided, in order to overcome the upstream pressure force.

Other axially-operated valve members in refrigeration unit spray cooling systems are disclosed in U.S. Pat. No. 4,274,266, which issued on Jun. 23, 1981, to Shires; and in U.S. Pat. No. 6,105,376, which issued on Aug. 22, 2000, to Stewart et al.

There is therefore a need for an inexpensive and simple liquid flow control valve having a simple structure and that is responsive to both an air flow stream as well as to ambient temperature conditions, so that it only operates when needed. There is also a need for an inexpensive and simple liquid flow control valve that can be operated by a lever-mounted float member to control a liquid level in a liquid reservoir.

SUMMARY OF THE INVENTION

Briefly stated, in accordance with one aspect of the present invention, a flow control valve is provided that includes a housing having a fluid inlet and a fluid outlet. A flow passageway extends between and interconnects the fluid inlet with the fluid outlet, the flow passageway including a reduced area orifice through which the fluid can flow. An upstream surface of the orifice defines a valve seat.

A valve actuation member is rotatably received in the housing and is positioned between the orifice and the fluid outlet. The actuation member extends transversely across a portion of the flow passageway and includes a cam surface, which can be an external, recessed region on a peripheral portion of the actuation member to define a notched surface.

A valve element having an elongated body member extends substantially axially within the flow passageway from and within the orifice to and in contact with the recessed region of the valve actuation member. The valve element includes an enlarged valve head at an upstream end of the body member adjacent to an upstream surface of the orifice, the valve head including a sealing surface extending laterally relative to the body member longitudinal axis, and a sealing element carried by the valve element between the valve head sealing surface and the upstream side of the orifice. The sealing element surrounds an opening defined by the orifice to prevent flow around the valve head and through the orifice when it is in contact with the upstream side of the orifice, and a reduced diameter section of the elongated body member adjacent to the valve head sealing surface that defines a flow area between the reduced diameter section and the orifice. The cam surface of the valve actuation member contacts an outer surface of the elongated body member.

Rotation of the valve actuation member about its axis of rotation and relative to the valve housing operates to cause the cam surface to tilt the valve element relative to the flow passageway axis. As a result, a portion of the valve head sealing surface is moved away from the upstream surface of the orifice to allow fluid flow from the fluid inlet to pass around the valve head and through the orifice to the fluid outlet.

BRIEF DESCRIPTION OF THE DRAWINGS

The structure, operation, and advantages of the present invention will become further apparent upon consideration of the following description, taken in conjunction with the accompanying drawings in which:

FIG. 8 is a side view of a spiral spring 32 adjuster for the valve embodiment shown in FIGS. 1 and 2.

DESCRIPTION OF THE PREFERRED EMBODIMENTS

Figure 1:
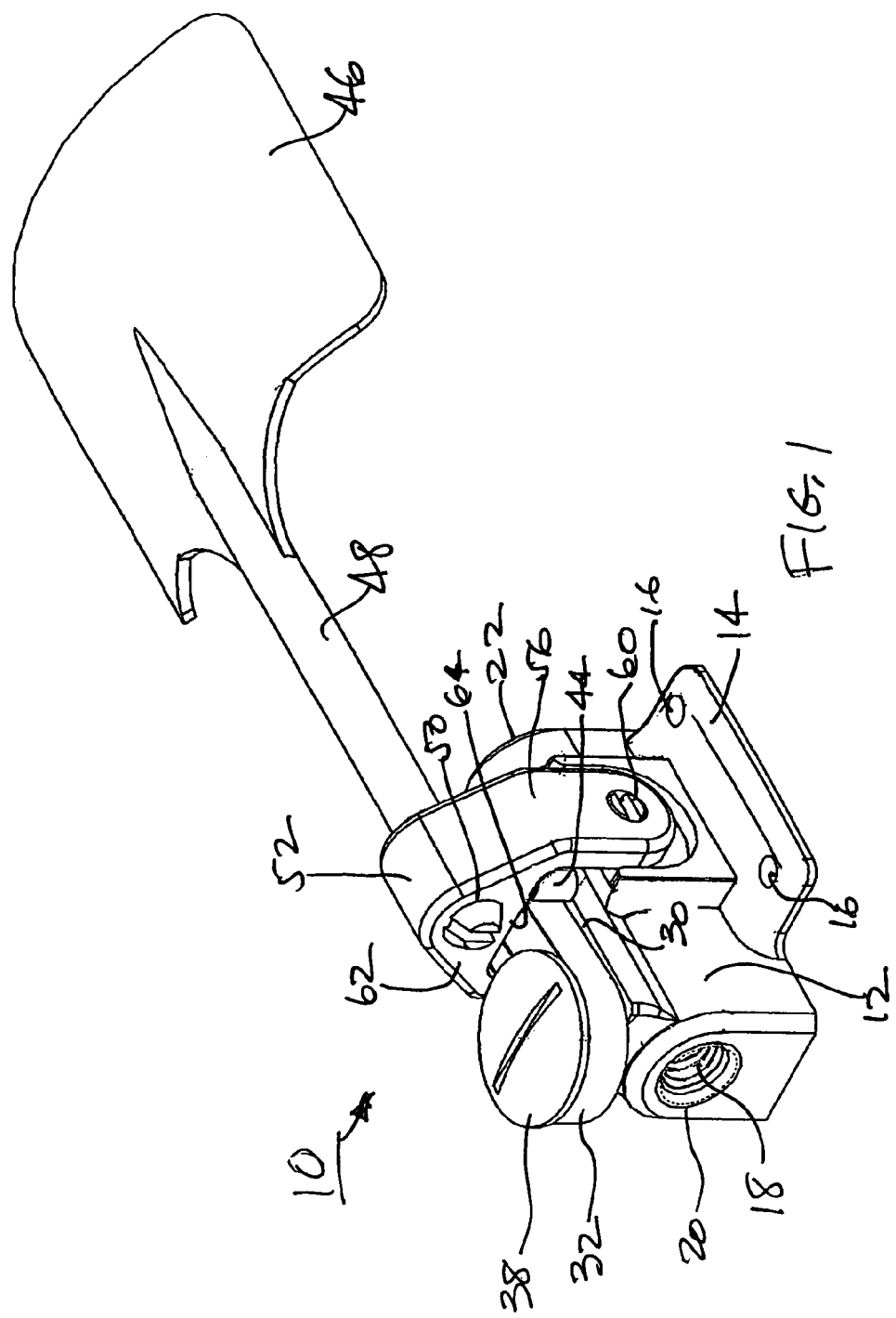
FIG. 1 is a perspective view of an embodiment of a flow control valve that falls within the scope of the present invention.
Figure 2:
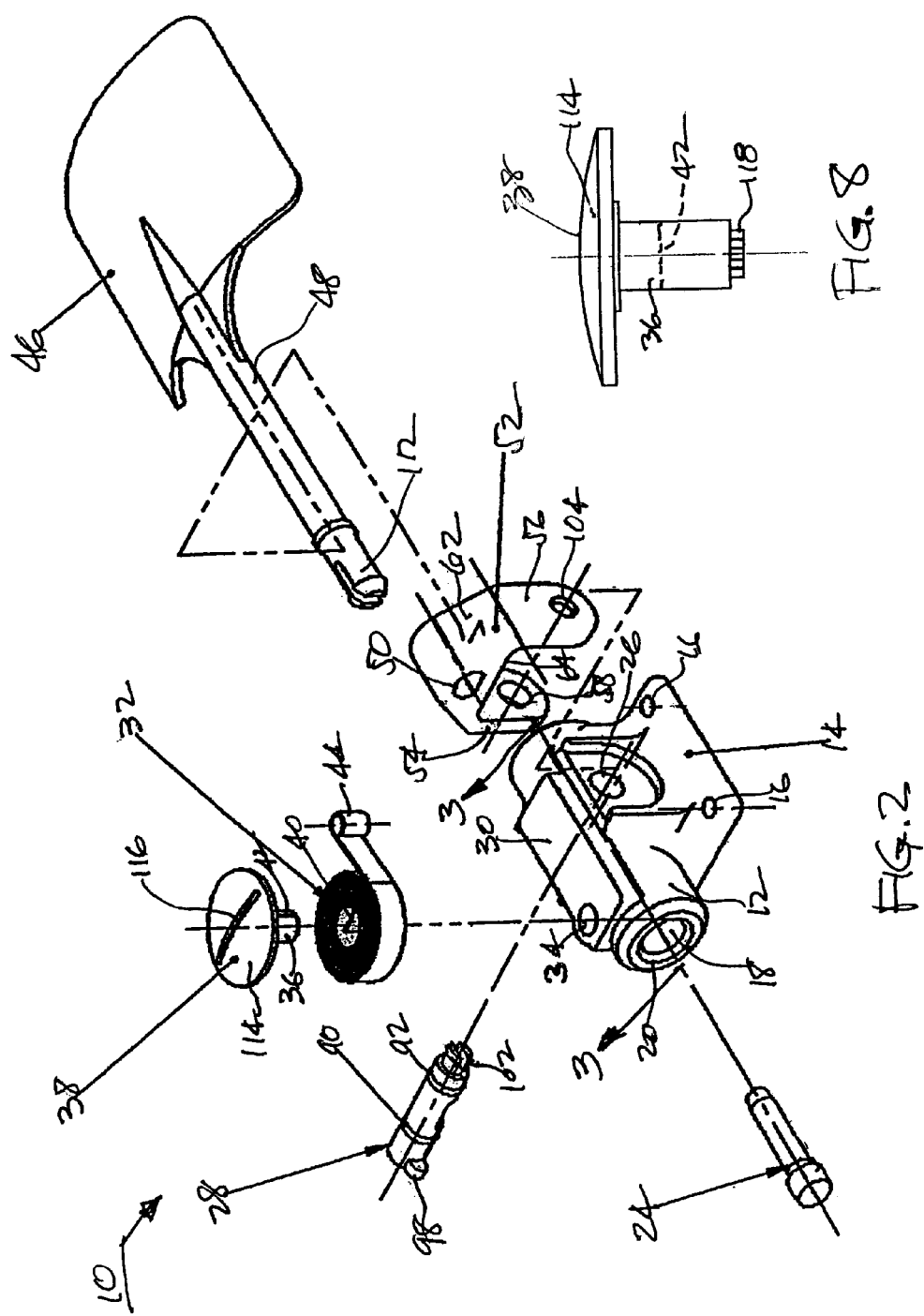
FIG. 2 is an exploded perspective view of the valve embodiment of FIG. 1 showing the several elements thereof.

Referring now to the drawings, and particularly to FIGS. 1 and 2 thereof, there is shown an embodiment of a flow control valve 10 that falls within the scope of the present invention. Valve 10 includes a valve housing 12 that has a generally rectangular base 14 having four spaced mounting holes 16 (only two of which are visible in (FIGS. 1 and 2) positioned adjacent each of the four corners of the base for mounting valve 10 to a suitable surface. Valve housing 12 can be a tubular, sleeve-like member that can be integrally formed with and carried by base 14, or it can be a separate element that is attached to base 14. Valve housing 12 includes a first, longitudinally-extending throughbore 18 that defines a water inlet 20 at one end and a water outlet 22 at its opposite end. Water inlet 20 and water outlet 22 can each be suitably internally threaded to allow connection with externally threaded water piping (not shown), or they can each be externally threaded to receive an internally threaded connector element (not shown), or the like, for an alternative connection arrangement for connecting to a water flow system. A valve pin 24 is received in first throughbore 18.

Valve housing 12 also includes a second, transversely-extending throughbore 26 that intersects first throughbore 18. Second throughbore 26 is adapted to rotatably receive a cylindrical valve actuation member in the form of a cam pin 28 that passes completely through second throughbore 26 and extends outwardly a predetermined distance at each outer side of valve housing 12. Cam pin 28 interacts with and actuates valve pin 24 for movement of the valve pin relative to a valve seat within valve housing 12 for allowing or impeding the flow of water through valve housing 12, as will be explained hereinafter.

The outer surface of valve housing 12 includes a flat upper surface 30 upon which a spiral bimetallic spring 32 rests. Spring 32 is so configured and adapted as to wind or unwind as the ambient temperature changes. A blind bore 34 extends inwardly from upper surface 30 and defines a spring adjuster opening for receiving the shank 36 of a spring adjuster 38. The inner end 40 of spiral spring 32 is received in a lateral slot 42 formed in the shank of spring adjuster 38, and the free, outer end 44 of spiral spring 32 lies on upper surface 30 of housing 12.

An actuating paddle 46 is positioned at the outer end of a paddle arm 48 that is received in a paddle arm opening 50 formed in a yoke-shaped paddle holder 52. Paddle holder 52 includes a pair of spaced, parallel legs 54, 56 that each have coaxially aligned openings 58, 60 for receiving the respective outer ends of cam pin 28. Holder legs 54, 56 extend from a central cross member 62 of paddle holder 52. Cross member 62 includes a lower transverse surface 64 that faces and overlies upper surface 30 of valve housing 12, and that also overlies the free outer end 44 of spiral spring 32.

In the use of valve 10 as a water flow control valve in a water spray cooling arrangement for a refrigeration system, paddle 46 is adapted to lie in the path of an air stream. When a flow of air having a sufficient velocity impinges against the downwardly-facing, concavely-curved surface of paddle 46 and overcomes the weight of paddle 46 and paddle arm 48, paddle 46 when in the generally horizontal position shown in FIGS. 1 and 2 is urged upwardly by the upward force provided by the moving air stream, which operates to pivot paddle holder 52 about the longitudinal axis of cam pin 28. If free outer end 44 of spiral spring 32 is positioned on upper surface 30 of valve housing 12 and below lower surface 64 of paddle holder 52, the rotation of paddle 46 and paddle arm 48 is blocked. In that regard, when paddle arm 48 is substantially horizontal, lower surface 64 of paddle holder 52 and upper surface 30 of valve housing 12 are substantially parallel and the spacing between those surfaces is initially only slightly larger than the height of free outer end 44 of spiral spring 32, to allow free movement of spring end 44 along upper surface 30 at predetermined low temperatures. But when the free outer end 44 of spiral spring 32 is in a position away from under lower surface 64 of paddle holder 52, cam pin 28 is rotated about its longitudinal axis by the pivotal movement of paddle holder 52, thereby tilting valve pin 24 relative to the longitudinal axis of throughbore 18 to allow water to flow through valve 10.

Figure 3:
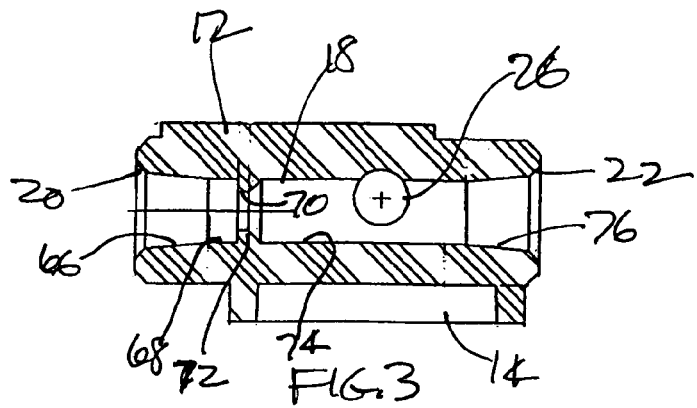
FIG. 3 is a longitudinal cross-sectional view of the valve housing for the valve embodiment shown in FIGS. 1 and 2, taken along the line 3-3 of FIG. 2.

The internal structure of valve housing 12 is shown in the cross-sectional view of FIG. 3. From left to right as viewed in FIG. 3, first throughbore 18 begins at water inlet 20 and includes a converging inlet section 66, followed by a first constant area section 68 that terminates at an orifice 70. The orifice is defined by a radially-inwardly-directed, annular wall 72 that extends inwardly from first constant area section 68 to form a flow opening, which can be of circular form. The upstream surface of annular wall 72 can serve as a sealing surface, and although shown as extending radially relative to the longitudinal axis of throughbore 18, it can instead be inclined relative to that axis. Downstream of orifice 70, first throughbore 18 diverges to join a second constant area section 74 that can have the same cross-sectional area and shape as that of first constant area section 68. At a point downstream of second constant area section 74 and upstream of water outlet 22, first throughbore 18 includes a diverging outlet section 76. Within second constant area section 74, transversely-positioned second throughbore 26 intersects first throughbore 18. As shown in FIG. 3, the longitudinal axis of second throughbore 26 is spaced radially outwardly of the longitudinal axis of first throughbore 18.

Positioned within first throughbore 18 is valve pin 24 (see FIG. 4), which includes an enlarged head 78 and a cylindrical shank 80. The inner end portion of shank 80, adjacent to head 78, has a gradual taper section 82 that terminates at a reduced diameter section next to head 78. The angle of taper section 82 relative to the longitudinal axis of valve pin 24, is of the order of from about 15° to about 30°. The intermediate portion of shank 80 can be a constant cross-sectional area center portion 84 of cylindrical form, having an outer diameter that is less than the inner diameter of second constant area section 74 of first throughbore 18 to allow the flow of fluid therebetween. The outer end 86 of shank 80 can have a converging taper.

Figure 4:
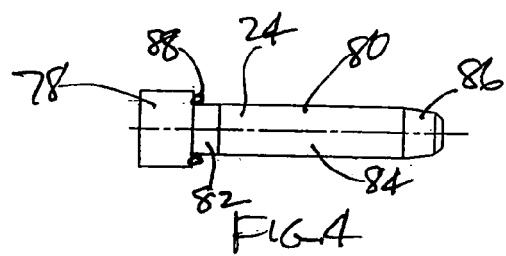
FIG. 4 is a side view of a valve flow control pin the valve embodiment shown in FIGS. 1 and 2.

Valve pin 24 is loosely received within first throughbore 18, with valve pin head 78 positioned adjacent to the upstream face of annular wall 72 of valve housing 12. As shown in FIG. 4, a flexible annular sealing ring 88, which can be an elastomeric O-ring or the like, is positioned at the radially-outwardly-extending inner end surface of valve pin head 78, within inner tapered section 82 of shank 80. When valve pin 24 is in its operative position within first throughbore 18, sealing ring 88 is in contact with both the inner end surface of valve pin head 78 and also with the upstream face of annular wall 72, to thereby block flow through orifice 70. The axial extent of center section 84 of shank 80 is so selected that the constant cross-sectional area portion of shank 80 extends toward water outlet 22 a distance sufficient to at least intersect the upstream edge of second throughbore 26. It can, however, extend partially or completely across second throughbore 26, if desired.

Figure 5:
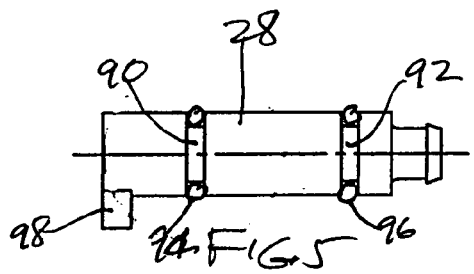
FIG. 5 is a top view of a cam pin 28 for the valve embodiment shown in FIGS. 1 and 2.

As noted earlier, second throughbore 26 rotatably receives cam pin 28. The structure of cam pin 28 is shown in further detail in FIGS. 5 and 6. As shown, cam pin 28 is a generally cylindrical member that includes a pair of axially spaced annular grooves 90, 92 that are each adapted to receive a respective flexible sealing ring 94, 96, which can be an elastomeric O-ring or the like, and can advantageously be a silicone-impregnated O-ring to reduce contact friction when cam pin 28 rotates within throughbore 26. The axial spacing between grooves 90, 92 is such that each sealing ring carried by cam pin 28 is positioned within the wall of valve housing 12, adjacent opposite ends of second throughbore 26, to prevent water leakage around cam pin 28 and through second throughbore 26. One end of cam pin 28 includes a radially-extending drive tab 98 that is adapted to be received in and to engage a correspondingly-shaped recess 100 (see FIG. 7) provided in leg 54 of paddle holder 52, so that both cam pin 28 and paddle holder 52 can pivot together about the longitudinal axis of second throughbore 26. The opposite end of cam pin 28 includes a split end 102 for a snap or interference fit within a suitably sized complementary opening 104 provided in leg 56 of paddle holder 52.

Figure 6:
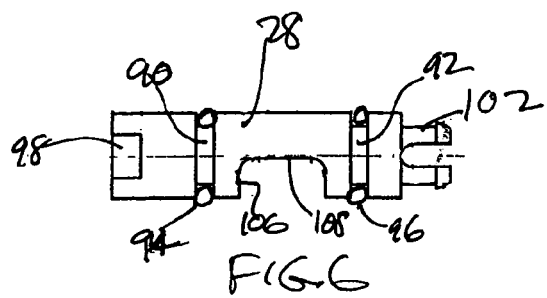
FIG. 6 is a side view of the cam pin 28 shown in FIG. 5.

Cam pin 28 has an outer diameter that is substantially the same as the diameter of second throughbore 26, but that allows rotational movement of cam pin 28 about the longitudinal axis of second throughbore 26. Additionally, formed on one side of cam pin 28 and between annular grooves 90, 92 is a recess 106 that defines a cam surface 108 that extends in an axial direction, parallel to the longitudinal axis of cam pin 28. Recess 106 can overlie and receive a portion of valve pin 24 and have a length in the axial direction of cam pin 28 that is sufficiently long to allow cam surface 108 to engage with the outer surface of valve pin 24 in direct surface-to-surface contact when the parts are in assembled condition within valve housing 12. Recess 106 can be so positioned on cam pin 28 that in a longitudinal direction of cam pin 28 recess 106 has a length that coincides substantially with the diameter of shank 80 of cam pin 28. As shown in FIG. 6, cam surface 108 can be the innermost wall surface of U-shaped recess 106, although it can take other forms, if desired, so long as it can function together with valve pin 24 in the manner described herein in order to control the flow of water through valve 10.

As shown in the drawings, paddle holder 52 can be a generally U-shaped, yoke-like member having a pair of laterally-spaced legs 54, 56 that are each connected at one end by a bridging cross member 62. Legs 54, 56 each include a pair of coaxially arranged cam pin apertures 104, 110 to rotatably receive respective outer ends of cam pin 28. Cross member 62 includes paddle arm opening 50 that has an axis that is substantially perpendicular to the axes of cam pin apertures 104, 110 for receiving an end of paddle arm 48, which includes a split end 112 for a snap-in or interference fit of the end of paddle arm 48 in opening 50 of paddle holder 52.

Figure 7:
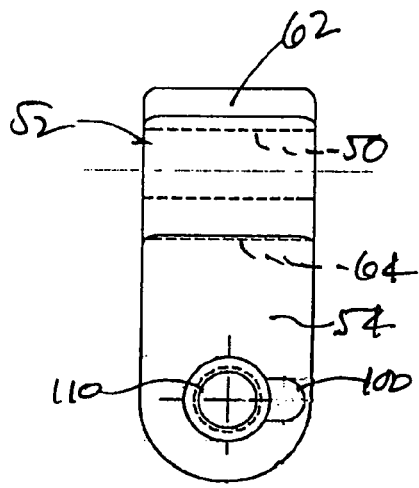
FIG. 7 is a side view of a paddle holder for the valve embodiment shown in FIGS. 1 and 2.

The outer end of paddle arm 48 carries paddle 46, which can be integrally formed with paddle arm 48, or it can be a separate piece that is suitably attached to the paddle arm. Additionally, as shown in FIG. 7, leg 54 of paddle holder 52 includes recess 100 formed on its outwardly-facing surface and extending laterally outwardly from cam pin opening 110. Recess 100 is adapted to receive drive tab 98 of cam pin 28 so that both paddle holder 52 and cam pin 28 pivot together, as a unit, about the longitudinal axis of second throughbore 26 of valve housing 12.

Referring once again to FIGS. 1 and 2, the inner end of bimetallic spiral spring 32 is held against upper surface 30 of valve housing 12 by spring adjuster 38. A side view of adjuster 38 is shown in FIG. 8, which includes adjuster head 114 that has an upwardly-facing slot 116 adapted to receive a screwdriver, or the like, to enable spring adjuster 38 to be rotated about its axis. Because it receives in slot 42 the inner end 40 of spiral spring 32, rotation of spring adjuster 38 causes spiral spring 32 to turn, relative to the axis of blind bore 34. Rotation of spring adjuster 38 also causes free outer end 44 of spiral spring 32 to pivot relative to the axis of blind bore 34, thereby shifting the position of end 44 relative to paddle holder 52.

Spring adjuster 38 is retained in position by an outer formation, such as an outer spline 118, which engages with a correspondingly-configured inner formation at the base of blind bore 34, such as an inner spline (not shown). The complementary inner formation is spaced below upper surface 30 of valve housing 12. Thus, by raising spring adjuster 38 and spring 32 a sufficient distance above upper surface 30 the splined connection is disengaged, and therefore spring adjuster 38 can be turned about its own axis to a different angular position so that the position of free end 44 of spiral spring 32 can be shifted relative to paddle holder 52. After repositioning spring end 44 to a desired position on upper surface 30, spring adjuster 38 can be locked in the new position by pressing it inwardly into blind bore 34 so that the splined connection is again engaged. As will be apparent, other formation shapes other than a spline can also be utilized, such as any form of polygon.

In operation, the position of paddle 46 as shown in FIGS. 1 and 2 represents the condition in which valve 10 is in a normally closed position, to block the flow of water from inlet 20 to outlet 22. In that regard, the upstream water pressure acts against the upstream surface of valve pin head 78 to urge it in a direction toward the upstream surface of annular wall 72. As a result, the force resulting from the upstream water pressure acting on valve pin head 78 causes sealing ring 88 to become partially compressed to seal the annular flow passage and thereby prevent water flow between orifice 70 and tapered section 82 of valve pin 24.

The flow passage through valve 10 opens when an upward force acts against paddle 46 to cause it to pivot in an upward direction. Such an upward force can be applied by a sufficiently strong air current that impinges against the lower surface of paddle 46. However, if the ambient temperature is at a level such that free outer end 44 of spiral spring 32 is between valve body upper surface 30 and lower surface 64 of paddle holder 52, pivotal movement of paddle holder 52 is blocked by spring end 44 to prevent upward movement of paddle 46, thereby maintaining valve 10 in the closed, no-flow condition. But if the ambient temperature increases, which causes bimetallic spiral spring 32 to uncoil, outer end 44 of spring 32 begins to move sidewise along upper surface 30. If a sufficient increase in temperature takes place, outer end 44 of bimetallic spring 32 is moved outwardly away from beneath paddle holder 52, thereby allowing pivotal movement of paddle 46, paddle arm 48, paddle holder 52, and cam pin 28 about the longitudinal axis of second throughbore 26. Thus, when valve 10 is used to control cooling water spray in air conditioning or refrigeration systems, the bimetallic spring can be so configured and positioned to allow flow of water through the valve only when the ambient temperature exceeds a predetermined temperature, such as about 75° F.

In addition to airflow actuation of valve 10 by the paddle arrangement disclosed, rotational movement of cam pin 28 can also be effected by other means. For example, when used as a water level control valve in or associated with a liquid reservoir paddle 46 can be replaced by a float member (not shown). Additionally, cam pin 28 could also be rotated by an electric motor drive arrangement that is actuated in response to a predetermined condition.

When cam pin 28 is rotated, cam surface 108 tilts about the longitudinal axis of cam pin 28 and the larger radius, edge portion of cam surface 108 acts against the outer surface of shank 80 of valve pin 24 to deflect valve pin 24. The downstream end of valve pin 24 is thereby shifted radially from its alignment with the longitudinal axis of first throughbore 18. As a result, valve pin 24 and valve pin head 78 are tilted from their coaxial position relative to the longitudinal axis of first throughbore 18. When that occurs, the downstream annular surface of valve pin head 78 is tilted away from its original perpendicular orientation relative to the longitudinal axis of first throughbore 18, thereby causing that annular surface to assume an angular, non-parallel position relative to a perpendicular plane that passes through the longitudinal axis of throughbore 18, resulting in a space or gap between that annular surface and annular wall 72. Water can then flow from inlet 20 through that gap, through orifice 70, and around and past taper section 82 of valve pin 24 to outlet 22. The water flow rate through the valve can be set by a suitable selection of the opening size of orifice 70 and the diameter and the taper angle of taper section 82 of valve pin 24.

The force needed to cause tilting or angular movement of valve pin 24 to initiate flow through valve 10 is very low. That result is achieved by virtue of the lever arm defined by the axial spacing along the longitudinal axis of first throughbore 18 between orifice 70 and the contact point on valve pin 24 of cam surface 108. In that regard, it is not necessary to overcome the entire axial force of the water pressure acting on the valve pin head, as is the case in valves in which axial movement of a closure member is utilized to control flow through the valve. As a result, the actuation torque required of the actuating assembly formed by paddle 46, paddle arm 48, and paddle holder 52 is correspondingly low, thereby requiring only a relatively small paddle area and short paddle arm, which enables those parts to be small to occupy little space, and to be made from lightweight materials, such as plastics. Thus, valve actuation can be almost instantaneous and with only a very brief time delay.

In terms of the materials from which the several parts of valve 10 can be made, valve pin 24 and cam pin 28 can advantageously be injection molded components made from Delrin® resin, or the like. And valve housing 12 can be injection molded Nylon® resin, or the like.

When valve 10 having the structure disclosed hereinabove is utilized as part of a condenser coil spray system of an air conditioning unit or a refrigeration unit, the valve controls when cooling water is applied to the condenser coils to cool them, to thereby increase the operating thermal efficiency of the unit and reduce operating costs. The control of the conditions under which water is allowed to flow through the valve is a function both of condenser fan operation, which provides the actuation force, and also of the ambient temperature.

In addition to its applicability to refrigeration unit spray cooling systems, the present valve can also be utilized in float-controlled flow systems, such as toilet tank refill control valves or chemical process plant tank refill control systems. In those arrangements the paddle is replaced by a float. The bimetal spiral spring 32 is not utilized unless the liquid flow is to be controlled as a function of the temperature of the liquid within the liquid reservoir.

It will be apparent that the disclosed valve structure provides a significant improvement over existing valve structures. The valve has a simple construction and allows self-regulation of the conditions under which water is permitted to flow through the valve. It also has few moving parts to experience wear, leading to a longer service life. As will be appreciated, the various valve components, except for the bimetallic spiral spring 32, can be made from injection molded plastic, such as ABS, polypropylene, and the like, which allows the valve and its parts to be produced at a relatively low cost.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A flow control valve comprising:
  a) a housing including a fluid inlet and a fluid outlet, and a flow passageway extending between and interconnecting the fluid inlet with the fluid outlet, the flow passageway having a longitudinal axis and including an orifice through which fluid flows, and a valve seat defined at an upstream surface surrounding the orifice;
  b) a valve actuation member rotatably received in the housing and positioned between the orifice and the fluid outlet, the valve actuation member extending transversely across the flow passageway and including a cam surface;
  c) a valve element in the form of an elongated body member having a longitudinal axis and extending within the flow passageway and within the orifice, a sealing surface carried by the valve element adjacent an upstream end of the valve element and engageable with the valve seat to selectively allow and prevent flow through the orifice, the valve element including a shank having a uniform cross section portion and extending between the valve element sealing surface to a downstream end of the valve element, wherein a portion of the shank lies within the orifice to define with the orifice a flow opening area;
  d) wherein the cam surface of the valve actuation member contacts an outer surface of the valve element, so that rotation of the valve actuation member about its axis and relative to the valve housing operates to tilt the valve element relative to the orifice to shift at least part of the valve element sealing surface away from the valve seat and thereby allow fluid flow from the fluid inlet to pass around the valve element and through the orifice and flow opening to the fluid outlet;
  e) wherein the valve actuation member includes at least one and that extends outwardly from the valve housing, and a lever arm is operatively connected with the valve actuation member to rotate the valve actuation member in response to lever arm movement, wherein the valve actuation member has two ends that each extend outwardly from respective opposite sides of the valve housing, including a holder carried by the valve actuation member for supporting the lever arm, and a paddle member carried by the lever arm; and
  f) a bimetallic spiral spring positioned between the holder and the valve housing to block holder movement when ambient temperature falls below a predetermined value.

2. A flow control valve in accordance with claim 1, wherein the flow passageway includes an inwardly-extending wall including an opening defining the orifice, and wherein the inwardly-extending wall is integrally formed with the valve housing.

3. A flow control valve in accordance with claim 2, wherein an upstream surface of the inwardly-extending wall defines the valve seat.

4. A flow control valve in accordance with claim 1, wherein the valve actuation member is cylindrical.

5. A flow control valve in accordance with claim 1, wherein the cam surface is a substantially flat surface.

6. A flow control valve in accordance with claim 1, wherein the cam surface is defined by a U-shaped recessed region on a peripheral portion of the actuation member.

7. A flow control valve in accordance with claim 6, wherein the valve element is in contact with the recessed region of the valve actuation member.

8. A flow control valve in accordance with claim 1, wherein the elongated body member has a longitudinal axis that extends substantially axially within the flow passageway.

9. A flow control valve in accordance with claim 1, wherein the sealing surface is a substantially radially-extending annular surface.

10. A flow control valve in accordance with claim 1, wherein the valve element includes an enlarged valve head adjacent the upstream end of the elongated body member and adjacent an upstream side of the orifice, wherein the valve head carries the sealing surface.

11. A flow control valve in accordance with claim 10, including an annular sealing element carried by the valve element between the valve head sealing surface and the upstream side of the orifice, and wherein the sealing element surrounds the orifice.

12. A flow control valve in accordance with claim 10, wherein rotation of the valve actuation member moves a portion of the valve head sealing surface away from the orifice.

13. A flow control valve in accordance with claim 1, wherein the sealing surface extends substantially radially relative to the valve element body member longitudinal axis.

14. A flow control valve in accordance with claim 1, wherein the flow opening is of substantially annular form.

15. A flow control valve in accordance with claim 1, wherein the shank is cylindrical.

16. A flow control valve in accordance with claim 1, wherein the valve element shank includes a reduced diameter section adjacent the valve element sealing surface.

17. A flow control valve comprising:

a) a housing including a fluid inlet and a fluid outlet, and a flow passageway extending between and interconnecting the fluid inlet with the fluid outlet, the flow passageway having a longitudinal axis and including an orifice through which fluid flows, and a valve seat defined at an upstream surface surrounding the orifice;

b) a valve actuation member rotatably received in the housing and positioned between the orifice and the fluid outlet, the valve actuation member extending transversely across the flow passageway and including a cam surface;

c) a valve element in the form of an elongated body member having a longitudinal axis and extending within the flow passageway and within the orifice, a sealing surface carried by the valve element adjacent an upstream end of the valve element and engageable with the valve seat to selectively allow and prevent flow through the orifice, the valve element including a shank having a uniform cross section portion and extending between the valve element sealing surface to a downstream end of the valve element, wherein a portion of the shank lies within the orifice to define with the orifice a flow opening area;

d) wherein the cam surface of the valve actuation member contacts an outer surface of the valve element, so that rotation of the valve actuation member about its axis and relative to the valve housing operates to tilt the valve element relative to the orifice to shift at least part of the valve element sealing surface away from the valve seat and thereby allow fluid flow from the fluid inlet to pass around the valve element and through the orifice and flow opening to the fluid outlet; and e) wherein the valve actuation member includes at least one end that extends outwardly from the valve housing, a lever arm operatively connected with the valve actuation member to rotate the valve actuation member in response to lever arm movement, and a float member carried by the lever arm for moving the valve actuation member in response to a variation of liquid level on which the float member rests.

\* \* \* \* \*